United States Patent [19]

Hamada et al.

[11] Patent Number: 5,861,465
[45] Date of Patent: Jan. 19, 1999

[54] THREAD RUBBER FOR GOLF BALLS

[75] Inventors: Akihiko Hamada, Kakogawa; Atsuko Ochi, Nishiwaki; Satoshi Mano, Akashi; Kuniyasu Horiuchi, Kobe; Michio Suzuki, Hyogo-ken, all of Japan

[73] Assignees: Sumitomo Rubber Industries, Ltd.; Sumitomo Seika Chemicals Co., Ltd., both of Hyogo-ken, Japan

[21] Appl. No.: 825,336

[22] Filed: Mar. 28, 1997

[30] Foreign Application Priority Data

Mar. 29, 1996 [JP] Japan .................................. 8-076211

[51] Int. Cl.$^6$ .......................... C08C 19/00; C08F 8/34; C08F 32/00; C08F 36/20
[52] U.S. Cl. .................................... 525/332.6; 525/332.7; 473/356; 473/357; 473/361; 473/363; 473/365; 473/373; 473/374; 473/376; 473/377
[58] Field of Search .................................... 473/256, 357, 473/365, 361, 363, 373, 374, 376, 377; 525/332.6, 332.7

[56] References Cited

U.S. PATENT DOCUMENTS 4,069,259  1/1978  Cipris et al. ........................... 260/608
4,696,475  9/1987  Tomita et al. ......................... 273/227

OTHER PUBLICATIONS

Derwent Abstracts 76–58844X/31, "Rubber Yarn Containing Disulphide", Jun. 1976.

*Primary Examiner*—Frederick Krass

[57] ABSTRACT

A thread rubber for thread wound golf balls having a high impact resilience and high strength, wherein the thread rubber is obtained by vulcanizing a rubber composition which comprises (a) a rubber component selected from the group consisting of natural rubber, a synthetic high-cis-polyisoprene rubber and a mixture thereof, (b) at least one specific diaryl disulfide, (c) a vulcanizing agent, and (d) antioxidant; the compound (b) being present in an amount of 0.5 to 10 parts by weight based on 100 parts by weight of the rubber component (a).

15 Claims, 1 Drawing Sheet

THREAD RUBBER FOR GOLF BALLS

FIELD OF THE INVENTION

The present invention relates to a thread rubber and more particularly to a thread wound golf ball using the thread rubber. The thread rubber has a high impact resilience and a high strength, and to a thread wound golf ball using the thread rubber.

BACKGROUND OF THE INVENTION

A thread wound golf ball is generally produced by winding thread rubber around a center in a highly drawn condition to form a thread wound core and then providing a covering on the cover. The thread rubber requires a high strength sufficient for tightly winding it on a center and also a high impact rubber resilience at a highly drawn condition sufficient for enhancing the flight distance.

In order to satisfy the above mentioned requirement for thread rubber, the thread rubber is conventionally formed from a mixture of natural rubber or a high-cis polyisoprene rubber with a low-cis polyisoprene rubber, because the natural rubber or high-cis polyisoprene rubber provides a high strength and the low-cis polyisoprene rubber a high impact resilience.

Japanese Kokoku Publication 54 (1979)-4733 proposes that a disulfide compound is mixed with natural rubber, because the disulfide compound improves the impact resilience of the natural rubber while maintaining the strength of the natural rubber.

The above publication considerably improves strength and impact resilience, but further improvement is desired.

SUMMARY OF THE INVENTION

The present invention was made to satisfy the above desire and provide thread rubber for golf balls obtainable by vulcanizing a rubber composition which comprises (a) a rubber component selected from the group consisting of natural rubber, a synthetic high-cis-polyisoprene rubber and a mixture thereof, (b) at least one compound selected from the group consisting of a diphenyl disulfide compound represented by the formula

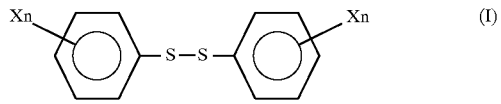

wherein X is the same or different, and represents an electron attractive substituent and n indicates the number of the X substituent and is an integer of 1 to 5, and a dinaphthyl disulfide compound represented by the formula

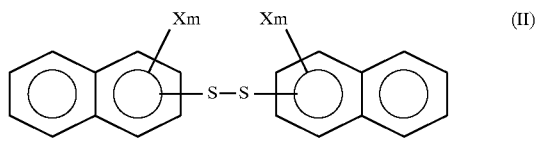

wherein X is the same or different, and represents an electron attractive substituent and m indicates the number of the X substituent and is an integer of 0 to 7, (c) a vulcanizing agent, and (d) antioxidant;

the compound (b) being present in an amount of 0.5 to 10 parts by weight based on 100 parts by weight of the rubber component (a). The compound (b) is a kind of disulfides, but has not been used for thread rubber for golf balls. The addition of the specific disulfide of the component (b) gives the thread high impact resilience and sufficient strength.

The present invention is also directed to a thread wound golf ball in-p-which a thread rubber layer is formed from the above thread rubber.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
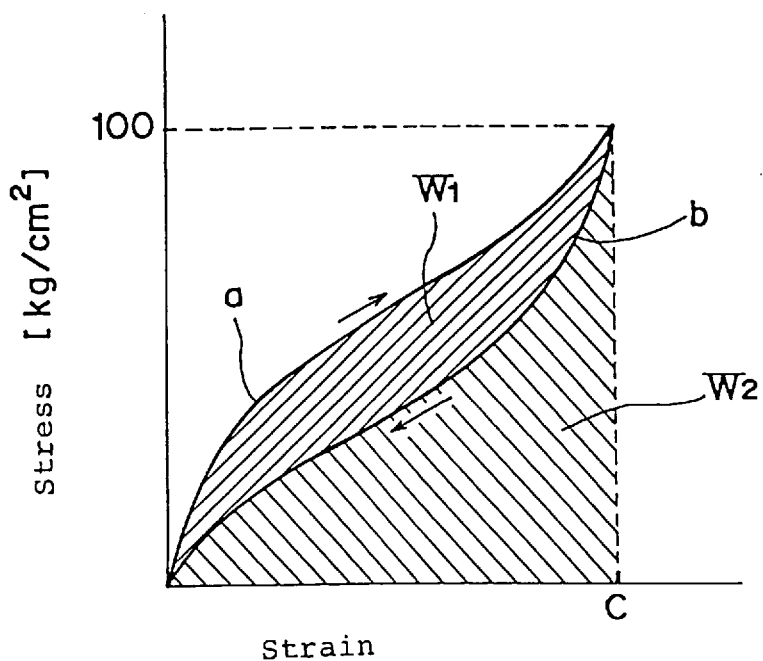
FIG. 1 shows show to determine the hysteresis loss and the elongation.

The rubber component (a) used in the present invention is selected from the group consisting of natural rubber, a synthetic high-cis polyisoprene rubber and a mixture thereof. The rubbers may be in a solid or latex. The latex contains rubber particles with a micron particle size colloidally dispersed in water and is preferred by the present invention, because no kneading process which adversely affects the molecular chains and reduces strength thereby is necessary.

The natural rubber can be any which has been used for this purposes and includes RSS#1, RSS#2, RSS#3, pale crepe, blown crepe and the like. The synthetic high-cis polyisoprene rubber is a rubber which is artificially synthesized and has a micro-structure similar to natural rubber having a cis-1,4 structure of more than 98%, and thus is usable in the same way as natural rubber. The synthetic high-cis polyisoprene rubber is commercially available from several rubber companies, examples of which are JSR IR 2200 available from Japan Synthetic Rubber Co., Ltd.; IR-10 available from Kuraray Co., Ltd.; Nipole IR 2200 available from Nippon Zeon Co., Ltd.; and the like. The latex type natural rubber includes high-ammonia preserved natural rubber latex having a solid content of about 60% by weight; a highly-purified deproteinized natural rubber latex having a solid content of about 60% by weight in which non-rubber content is less than 0.1% by weight by deproteinization; and the like. The natural rubber can preferably be deproteinized natural rubber for enhancing impact resilience, because deproteinization removes fatty acids which accelerates the orientation and crystallization of the rubber.

The rubber component (a) may contain another rubber in addition to the above mentioned natural rubber and synthetic polyisoprene rubber, but the other rubber is preferably limited to not more than 50% by weight, more preferably not more than 30% by weight based on the total rubber weight. Otherwise, the strength would be degraded. Examples of the other rubbers are low-cis polyisoprene rubber, polybutadiene rubber, ethylene-propylene rubber (EPDM) and the like. The low-cis polyisoprene rubber is polyisoprene rubber having a cis-1,4 content of less than 92%, of which the solid type is available from Shell Chemical Co., as Kaliflex IR 305, 307, 309 etc. and the latex is available from Sumitomo Seika Chemicals Co., Ltd. as Maxprene IR; and the like.

According to the present invention, at least one compound (I) or (II) of component (b) is formulated into the rubber composition for the thread rubber of the present invention in an amount of 0.1 to 10 parts by weight based on 100 parts by weight of the rubber component (a).

It is not clear what mechanism compound (I) and (II) fulfills in the chemical reaction or vulcanization, but the present inventors submit the following theory. The diphenyl (or dinaphthyl) disulfide having electron attractive substituents as noted in component (b) can be easily changed to free radical by cleavage between two sulfur atoms. Accordingly, when the diphenyl (or dinaphthyl) disulfide having an electron attractive substituents is added to the high-cis polyisoprene rubber or natural rubber and vulcanized, the free radicals (i.e. the thiyl radial) produced from the sulfide react with the double bonds to produce many trans-isomers which enhance the impact resilience of the resulting thread rubber.

By the term "electron attractive substituent" used herein is meant a substituent which has a substituent coefficient (σ-value) according to Hammet rule of more than zero, for example, chloro, bromo, iodo, fluoro, carboxyl, carboxyl ester, cyano, amido, nitro, acetyl, formyl and the like. In the present invention, the electron attractive substituent may be one kind or two or more kinds from the above listed groups. Preferred are chloro, bromo, carboxyl ester, cyano and acetyl.

Typical examples of the compound represented by the formula (I) are bis(4-chlorophenyl) disulfide, bis(2-chlorophenyl) disulfide, bis(3-chlorophenyl) disulfide, bis(4-bromophenyl) disulfide, bis(2-bromophenyl) disulfide, bis(3-bromophenyl) disulfide, bis(4-fluorophenyl) disulfide, bis(4-iodophenyl) disulfide, bis(2,5-dichlorophenyl) disulfide, bis(3,5-dichlorophenyl) disulfide, bis(2,4-dichlorophenyl) disulfide, bis(2,6-dichlorophenyl) disulfide, bis(2,5-dibromophenyl) disulfide, bis(3,5-dibromophenyl) disulfide, bis(2-chloro-5-bromophenyl) disulfide, bis(2,4,6-trichlorophenyl) disulfide, bis(2,3,4,5,6-pentachlorophenyl) disulfide, bis(4-cyanophenyl) disulfide, bis(2-cyanophenyl) disulfide, bis(4-nitrophenyl) disulfide, bis(2-nitrophenyl) disulfide, 2,2'-dithiodibenzoic ethyl, 2,2'-dithiodibenzoic methyl, 2,2'-dithiodibenzoic acid, 4,4'-dithiodibenzoic ethyl, bis(4-acetylphenyl) disulfide, bis(2-acetylphenyl) disulfide, bis(4-formylphenyl) disulfide, bis(4-carbamoylphenyl) disulfide and the like. Preferred are bis(4-chlorophenyl) disulfide, bis(2-chlorophenyl) disulfide, bis(4-bromophenyl) disulfide, bis(2-bromophenyl) disulfide, bis(2,5-dichlorophenyl) disulfide, bis(3,5-dichlorophenyl) disulfide, bis(2,4-dichlorophenyl) disulfide, bis(2,6-dichlorophenyl) disulfide, bis(2,5-dibromophenyl) disulfide, bis(3,5-dibromophenyl) disulfide, bis(2-chloro-5-bromophenyl) disulfide, bis(4-cyanophenyl) disulfide and bis(2-cyanophenyl) disulfide.

Typical examples of the dinaphthyl sulfides represented by the formula (II) are 1,1'-dinaphthyl disulfide, 2,2'-dinaphthyl disulfide, 1,2'-dinaphthyl disulfide 2,2'-bis(1-chlorodinaphthyl) disulfide, 2,2'-bis(1-bromonaphthyl) disulfide, 1,1'-bis(2-chloronaphthyl) disulfide, 2,2'-bis(1-cyanonaphthyl) disulfide, 2,2'-bis(1-acetylnaphthyl) disulfide and the like.

The above compound (b) is added to the rubber composition for the thread rubber in an amount of 0.5 to 10 parts by weight, preferably 1 to 7 parts by weight, based on 100 parts by weight of the rubber component (a). Amounts of less than 0.5 parts by weight do not sufficiently improve or enhance the impact resilience and amounts of more than 10 parts by weight accelerate the reaction too much and thus leave unreacted compounds which reduce strength.

The rubber composition for the thread rubber of the present invention contains a vulcanizing agent (c), and an antioxidant (d) in addition to the above two components (a) and (b).

The vulcanizing agent (c) employed in the present invention can be one which has been used for the vulcanization of thread rubber for golf balls, and includes sulfur; an organic sulfur compound excepting the above mentioned compound (b), such as morpholine disulfide and a sodium salt dihydrate of hexamethylene-1,6-bisthiosulfate; an organic peroxide, such as dicumyl peroxide; and the like. Sulfur is most preferred. The vulcanizing agent (c) may be present in the rubber composition in an amount of 0.1 to 10 parts by weight, based on 100 parts by weight of the rubber component (a).

The antioxidant (d) employed in the present invention can be anyone which has been used for the thread rubber for golf balls. Typical examples thereof are 4-methyl-2,6-di-t-butylphenol, 2,2'-methylenebis-(4-ethyl-6-t-butylphenol), tetrakis-[methylene-3-(3',5'-di-t-butyl-4'-hydroxyphenyl) propionate]methane, 4,4'-thiobis-(6-t-butyl-3-methylphenol) and the like. The antioxidant (d) may be present in the rubber composition in an amount of 0.1 to 5 parts by weight, based on 100 parts by weight of the rubber component (a).

The rubber composition for the thread rubber of golf balls may contain a vulcanization accelerator, a filler, an oil and the like if necessary, in addition to the above components (a) to (d).

The vulcanization accelerator used in the present invention can be anyone which has been used for the vulcanization of the thread rubber for golf balls. Typical examples thereof are butyl aldehyde-aniline condensate (available from Ohuchi Shinko Chemical K.K. as Noccelar 8), diphenylguanidine (DPG), benzothiazole (M), dibenzothiadyl disulfide (DM), n-cyclohexyl-2-benzothiazole sulfenamide (CZ), n-t-butyl-2-benzothiazole sulfenamide (NS) and the like. The accelerator may be contained in the rubber composition in an amount of 0.1 to 5 parts by weight, based on 100 parts by weight of the rubber component (a).

Typical examples of the fillers are kaoline, clay, calcium carbonate and the like. The oil can include naphtenic oil, diocryl adipate, dioctyl azelate, isooctyl tallate and the like. The amount of the filler may be within the range of 0 to 5 parts by weight, based on 100 parts by weight of the rubber component (a). The amount of the oil may be within the range of 0 to 10 parts by weight, based on 100 parts by weight of the rubber component (a).

The thread rubber may be prepared by mixing the above mentioned components in a mixer (e.g. a kneader or a Banbury mixer) and then extruding it in the form of sheet having a thickness of about 0.5 mm, followed by vulcanizing at a temperature of 100° to 200° C. for 15 to 240 minutes. The resulting vulcanized sheet is cut into threads having a width of 1 to 2 mm.

A thread wound golf ball can be produced using the above obtained thread rubber. The thread rubber is wound on a center to form a thread wound core. The length of the thread rubber wound on the center is not limited, but can be within the range of 4 to 8 m. The center can be one which is used for thread wound golf balls, such as a solid center formed from a vulcanized rubber and a liquid center composed of a rubber bag and liquid encapsulated in the rubber bag. The rubber for the solid center is known to the art, and may contains butadiene rubber, curing agent, filler and the like. The liquid used for the liquid center may be water, or a paste containing filler in water. The thread wound core is then covered with a cover material selected from the group consisting of ionomer resin and tranpolyisoprene (balata). When forming a cover, many depressions called "dimples"

are generally formed on the cover for controlling air resistance when flying. The golf ball having a dimpled cover is then coated with paint for commercial sales.

EXAMPLES

The present invention will be illustrated by Examples which, however, are not to be construed as limiting the present invention to their details.

Examples 1 to 11 and Comparative Examples 1 to 5

(Preparation of latex compositions)

Sixteen kinds of latex compositions were prepared from the ingredients shown in Tables 1 to 3 by mixing. In Tables 1 to 3, the numbers show parts by weight and in case of latex, it shows an amount of rubber content. The other components are shown in an amount of effective component. Details of the formulated chemicals are shown after Table 3. The amount of the specific disulfide of the component (b) in each Example is adjusted to be the same moles using a basis as 2.0 parts by weight of diphenyl disulfide of Comparative Examples 4 and 5, excepting Example 7 which used a larger amount.

TABLE 1

| Example number | 1 | 2 | 3 | 4 | 5 | 6 |
|---|---|---|---|---|---|---|
| Rubber component (a) | | | | | | |
| IOTEX C-60 (60%)*1 | — | — | — | — | — | 100 |
| Deproteinized natural rubber latex (60%)*2 | 100 | 100 | 100 | 100 | 100 | — |
| Maxprene IR latex (65%)*3 | — | — | — | — | — | — |
| Specific disulfide (b) | | | | | | |
| Bis(4-chlorophenyl) disulfide | 2.6 | — | — | — | — | — |
| Bis(2,5-dichlorophenyl) disulfide | — | 3.3 | — | — | — | 3.3 |
| Bis(4-bromophenyl) disulfide | — | — | 3.4 | — | — | — |
| 2,2'-dithiobenzoic ethyl | — | — | — | 3.3 | — | — |
| Bis(2-acetylphenyl) disulfide | — | — | — | — | 2.8 | — |
| Vulcanization accelerator (emulsion; effective component 20%)*4 | 1.0 | 1.0 | 1.0 | 1.0 | 1.0 | 1.0 |
| Sulfur (dispersion; effective component 50%) | 3.0 | 3.0 | 3.0 | 3.0 | 3.0 | 3.0 |
| Antioxidant (dispersion: effective component 40%)*5 | 1.0 | 1.0 | 1.0 | 1.0 | 1.0 | 1.0 |

Each disulfide (b) was formulated in the form of a dispersion having an effective component content of 33.3% by weight.

TABLE 2

| Example number | 7 | 8 | 9 | 10 | 11 |
|---|---|---|---|---|---|
| Rubber component (a) | | | | | |
| IOTEX C-60 (60%)*1 | — | — | — | — | — |
| Deproteinized natural rubber latex (60%)*2 | 100 | 100 | 100 | 100 | 100 |
| Maxprene IR latex (65%)*3 | — | — | — | — | — |
| Specific disulfide (b) | | | | | |
| Bis(2,5-dichlorophenyl) disulfide | 5.0 | — | — | — | — |
| Bis(2-cyanophenyl) disulfide | — | 2.5 | — | — | — |
| 2,2'-Dinaphthyl disulfide | — | — | 2.9 | — | — |
| 2,2'-Bis(1-chlorodinaphthyl) disulfide | — | — | — | 3.6 | — |
| Bis(3,5-dichlorophenyl) disulfide | 1.0 | 1.0 | 1.0 | 1.0 | 1.0 |
| Vulcanization accelerator (emulsion; effective component 20%)*4 | | | | | |
| Sulfur (dispersion; effective component 50%) | 3.0 | 3.0 | 3.0 | 3.0 | 3.0 |
| Antioxidant (dispersion: effective component 40%)*5 | 1.0 | 1.0 | 1.0 | 1.0 | 1.0 |

Each disulfide (b) was formulated in the form of a dispersion having an effective component content of 33.3% by weight.

TABLE 3

| Comparative Example number | 1 | 2 | 3 | 4 | 5 |
|---|---|---|---|---|---|
| Rubber component (a) | | | | | |
| IOTEX C-60 (60%)*1 | 40 | 100 | — | 100 | — |
| Deproteinized natural rubber latex (60%)*2 | — | — | 100 | — | 100 |
| Maxprene IR latex (65%)*3 | 60 | — | — | — | — |
| Specific disulfide (b) | | | | | |
| Diphenyl disulfide | — | — | — | 2.0 | 2.0 |
| Vulcanization accelerator (emulsion; effective component 20%)*4 | 1.0 | 1.0 | 1.0 | 1.0 | 1.0 |
| Sulfur (dispersion; effective component 50%) | 3.0 | 3.0 | 3.0 | 3.0 | 3.0 |
| Antioxidant (dispersion: effective component 40%)*5 | 1.0 | 1.0 | 1.0 | 1.0 | 1.0 |

Each disulfide (b) was formulated in the form of a dispersion having an effective component content of 33.3% by weight.
*1IOTEX C-60: High ammonia preserved natural rubber latex available from Malaysia IOI.
*2Deproteinized ammonia preserved natural rubber latex having a non-rubber content of less than 0.05% by weight.
*3Maxprene IR: Low cis-polyisoprene rubber latex available from Sumitomo Seika Chemicals Co., Ltd.
*4Butyl aldehyde-aniline condensate available from Ohuchi Shinko Kagaku K.K. as Noccelar 8.
*52,2'-Methylenebis-(4-ethyl-6-t-butylphenol) available from Yoshitomi Pharmaceutical Industries, Ltd.

(Preparation of thread rubber)

Each latex composition according to the ingredients shown in Examples 1–11 and Comparative Examples 1–5 was solidified on an endless belt on which a solidifying solution of an aqueous calcium chloride was coated, to form a sheet. The sheet was dried and then rolled up on a drum which was vulcanized at 135° C. for 2 hours in a vulcanizer to form a vulcanized rubber sheet having width 350 mm×thickness 0.5 mm×length 50 m. It was then cut into width 1.6 mm to form thread rubber. The resulting thread rubber was subjected to an evaluation of hysteresis loss (%) and elongation at 100 Kg/cm$^2$ tensile force as the determination of impact resilience, and their results are shown in Tables 4 to 6.

(Preparation of thread wound golf balls)

The thread rubber obtained above was wound on a liquid center having a diameter of 28.3 mm in a drawn condition to form a thread wound core having a diameter of about 39.5 mm. It was then covered with balata cover to form a thread wound golf ball having a diameter of about 42.7 mm, a ball weight of 45.3 to 45.5 g and a PGA compression of about 90. The resulting thread wound golf ball was subjected to an evaluation of impact resilience. The impact resilience was determined by coefficient of restitution. The strength of the thread rubber was also evaluated by number of thread breakage when winding of a liquid center. The results are shown in Tables 4 to 6.

(Method of test)

(1) Hysteresis loss and elongation at 100 Kg/cm² tensile force

FIG. 1 explains how to determine the hysteresis loss and the elongation at 100 Kg/² tensile force.

FIG. 1 shows a hysteresis curve of stress-strain when a sample of the thread rubber is stretched at a tensile rate of 500 mm/min until 100 Kg/² constant stress by a tensile strength tester (Curve a in FIG. 1) and then restored to its original state (Curve b in FIG. 1). Hysteresis loss is a value of energy loss ($W_1$) divided with supply energy ($W_1+W_2$) and is indicated in the unit of percentage.

Hysteresis loss (%)=$W_1/(W_1+W_2) \times 100$

Elongation is a strain amount at 100 Kg/cm² tensile force, that is the point (c), and is determined from the following equation in the unit of percentage.

Elongation (%)=(stretched length/original length−1)

(2) Average number of thread breakage

Ten dozens of thread wound cores were produced by winding the thread rubber on a liquid center and number of breakage of the thread rubber was given. It was then divided with number of cores to obtain an average number of thread breakage on one core.

(3) Coefficient of restitution

A golf ball was hit at a head speed of 45 m/sec and a coefficient of restitution was directly measured by an initial velocity tester available from R & A.

Results of the tests

TABLE 4

| Example number | 1 | 2 | 3 | 4 | 5 | 6 |
|---|---|---|---|---|---|---|
| Hysteresis loss (%) | 38 | 30 | 37 | 35 | 34 | 36 |
| Elongation (%) | 1100 | 1200 | 1100 | 1150 | 1150 | 1100 |
| Number of thread breakage | 0.01 | 0.03 | 0.01 | 0.02 | 0.02 | 0.01 |
| Coefficient of restitution | 0.7650 | 0.7750 | 0.7650 | 0.7700 | 0.7700 | 0.7650 |

TABLE 5

| Example number | 7 | 8 | 9 | 10 | 11 |
|---|---|---|---|---|---|
| Hysteresis loss (%) | 34 | 32 | 37 | 36 | 30 |
| Elongation (%) | 1250 | 1200 | 1100 | 1150 | 1200 |
| Number of thread breakage | 0.07 | 0.05 | 0.03 | 0.04 | 0.04 |
| Coefficient of restitution | 0.7780 | 0.7700 | 0.7650 | 0.7670 | 0.7750 |

TABLE 6

| Comparative Example number | 1 | 2 | 3 | 4 | 5 |
|---|---|---|---|---|---|
| Hysteresis loss (%) | 40 | 60 | 53 | 45 | 44 |
| Elongation (%) | 1100 | 800 | 850 | 1000 | 1030 |
| Number of thread breakage | 1.5 | 0.01 | 0.02 | 0.1 | 0.08 |
| Coefficient of restitution | 0.7650 | 0.7150 | 0.7250 | 0.7500 | 0.7550 |

As is apparent from the above results, the thread rubbers of Examples 1–11 are good in impact resilience and strength in comparison with the thread rubbers of Comparative Examples, and satisfy the required performance of golf balls. The thread rubber of Comparative Example 1 which mainly contained low cis-polyisoprene rubber shows good impact resilience but shows many thread breakage, thus poor strength. Comparative Examples 2 and 3 show thread rubber which mainly contained natural rubber but did not contain the component (b) of the present invention. The thread rubbers of Comparative Examples 2 and 3 show poor impact resilience. Comparative Examples 4 and 5 are thread rubber which improved those obtained in Comparative Examples 2 and 3 by adding diphenyl disulfide, which reduce number of thread breakage, but do not show sufficient impact resilience.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. Thread rubber for thread wound golf balls obtained by vulcanizing a rubber composition which comprises
   (a) a rubber component selected from the group consisting of natural rubber, a synthetic high-cis-polyisoprene rubber and a mixture thereof,
   (b) at least one compound selected from the group consisting of a diphenyl disulfide compound represented by the formula

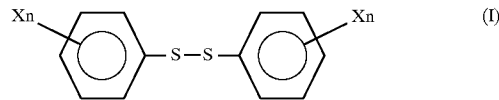

wherein X is the same or different, and represents an electron attractive substituent and n indicates the number of the X substituent and is an integer of 1 to 5, and a dinaphthyl disulfide compound represented by the formula

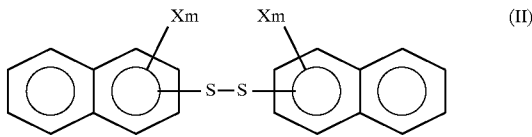

wherein X is the same or different, and represents an electron attractive substituent and m indicates the number of the X substituent and is an integer of 0 to 7,
   (c) a vulcanizing agent, and
   (d) antioxidant;
   the compound (b) being present in an amount of 0.5 to 10 parts by weight based on 100 parts by weight of the rubber component (a).

2. The thread rubber according to claim 1, wherein the rubber component (a) is latex.

3. The thread rubber according to claim 1, wherein the natural rubber is deproteinized natural rubber.

4. The thread rubber according to claim 1, wherein the rubber component (a) contains another rubber in an amount of not more than 50% by weight based on a total rubber component (a).

5. The thread rubber according to claim 4, wherein the other rubber includes a low-cis polyisoprene rubber, polybutadiene rubber or ethylene-propylene rubber (EPDM).

6. The thread rubber according to claim 1, wherein the electron attractive substituent X is selected from the group consisting of chloro, bromo, iodo, fluoro, carboxyl, caroxyl ester, cyano, amido, nitro, acetyl and formyl.

7. The thread rubber according to claim 1, wherein the compound (I) is selected from the group consisting of bis(4-chlorophenyl) disulfide, bis(2-chlorophenyl) disulfide, bis(4-bromophenyl) disulfide, bis(2-bromophenyl) disulfide, bis(2,5-dichlorophenyl) disulfide, bis(3,5-dichlorophenyl) disulfide, bis(2,4-dichlorophenyl) disulfide, bis(2,6-dichlorophenyl) disulfide, bis(2,5-dibromophenyl) disulfide, bis(3,5-dibromophenyl) disulfide, bis(2-chloro-5-bromophenyl) disulfide, bis(4-cyanophenyl) disulfide and bis(2-cyanophenyl) disulfide.

8. The thread rubber according to claim 1, wherein the compound (II) is selected from the group consisting of 1,1'-dinaphthyl disulfide, 2,2'-dinaphthyl disulfide, 1,2'-dinaphthyl disulfide 2,2'-bis(1-chlorodinaphthyl) disulfide, 2,2'-bis(1-bromonaphthyl) disulfide, 1,1'-bis(2-chloronaphthyl) disulfide, 2,2'-bis(1-cyanonaphthyl) disulfide and 2,2'-bis(1-acetylnaphthyl) disulfide.

9. The thread rubber according to claim 1, wherein the vulcanizing agent (c) includes sulfur; an organic sulfur compound separate from compound (b); or an organic peroxide.

10. The thread rubber according to claim 1, wherein the vulcanizing agent (c) is contained in the rubber composition in an amount of 0.1 to 10 parts by weight, based on 100 parts by weight of the rubber component (a).

11. The thread rubber according to claim 1, wherein the antioxidant (d) is selected from the group consisting of 4-methyl-2,6-di-t-butylphenol, 2,2'-methylenebis-(4-ethyl-6-t-butylphenol), tetrakis[methylene-3-(3',5'-di-t-butyl-4'-hydroxyphenyl)propionate]methane and 4,4'-thiobis-(6-t-butyl-3-methylphenol).

12. The thread rubber according to claim 1, wherein the antioxidant (d) is contained in the rubber composition in an amount of 0.1 to 5 parts by weight, based on 100 parts by weight of the rubber component (a).

13. The thread rubber according to claim 1, wherein the rubber composition further comprises a vulcanization accelerator selected from the group consisting of butyl aldehyde-aniline condensate, diphenylguanidine, benzothiazole, dibenzothiadyl disulfide, n-cyclohexyl-2-benzothiazole sulfenamide and n-t-butyl-2-benzothiazole sulfenamide.

14. The thread rubber according to claim 13, wherein the vulcanization accelerator is contained in the rubber composition in an amount of 0.1 to 5 parts by weight, based on 100 parts by weight of the rubber component (a).

15. A thread wound golf ball comprising a center, a thread rubber layer formed on the center and a cover covering on the thread layer, wherein said thread layer is formed from thread rubber obtained by vulcanizing a rubber composition which comprises (a) a rubber component selected from the group consisting of natural rubber, a synthetic high-cis-polyisoprene rubber and a mixture thereof, (b) at least one compound selected from the group consisting of a diphenyl disulfide compound represented by the formula

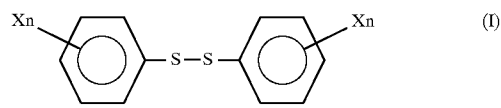

wherein X is the same or different, and represents an electron attractive substituent and n indicates the number of the X substituents and is an integer of 1 to 5, and a dinaphthyl disulfide compound represented by the formula

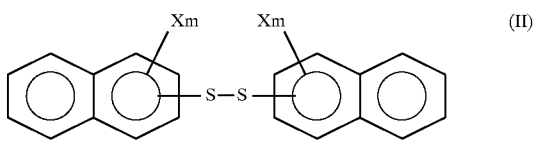

wherein X is the same or different and represents an electron attractive substituent and m indicates the number of the X substituent and is an integer of 0 to 7, (c) a vulcanizing agent, and (d) antioxidant;

the compound (b) being present in an amount of 0.5 to 10 parts by weight based on 100 parts by weight of the rubber component (a).

* * * * *